April 23, 1946.　　　W. GILBERT, SR　　　2,398,783
ROTARY SEAL
Filed Jan. 19, 1942　　　2 Sheets-Sheet 2

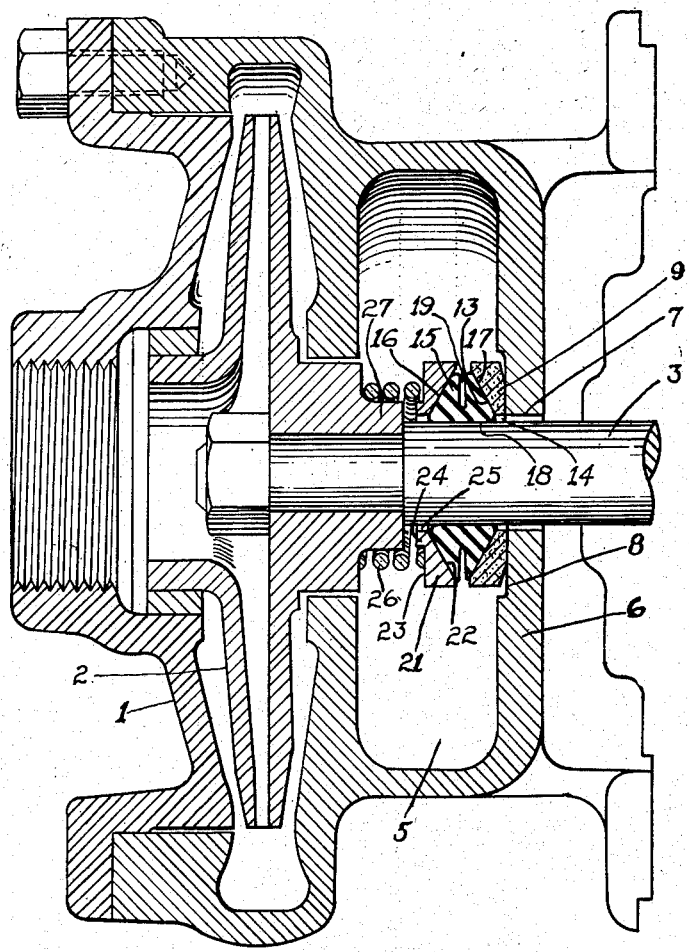

Inventor
WALTER GILBERT, SR.
By Lewis D. Konigsford
Attorney

Patented Apr. 23, 1946

2,398,783

UNITED STATES PATENT OFFICE 2,398,783

ROTARY SEAL

Walter Gilbert, Sr., Johnstown, Pa., assignor to Syntron Company, Homer City, Pa., a corporation of Delaware Application January 19, 1942, Serial No. 427,253

6 Claims. (Cl. 286—7)

The present invention relates to apparatus for sealing relatively rotating members against leakage of gas or any other fluid therebetween, and is particularly applicable to the sealing of a rapidly rotating shaft.

It is an object of the invention to provide a seal of this character which is applicable to a variety of installations or uses.

Another object of the invention is the provision of a seal of this character having long life and great durability under severe operating conditions.

A further object is the provision of a seal which is self adjusting to take up wear, and which requires little or no servicing or lubrication after initial installation.

In accordance with the present invention I provide a seal comprising a member or ring of a solid unctuous material, such as, bonded graphite, surrounding the shaft to be sealed and held in abutting sealing relation to a plane surface by means of a solid expansible or resilient sealing sleeve, or the like, which prevents leakage at one periphery of the ring. Preferably the contacting or sealing face of the ring or of the abutting surface is formed to gradually increase the area of contact with the abutting face as the ring or abutment wears away. Preferably also, the resilient sleeve has a truncated conical end engaging a similar truncated conical face of the unctuous sealing ring or backing washer therefor, and if desired, the resilient sleeve may be grooved circumferentially. I also prefer to back the resilient sleeve by a spring or the like to urge it into contact with the sealing ring.

Figure 4:
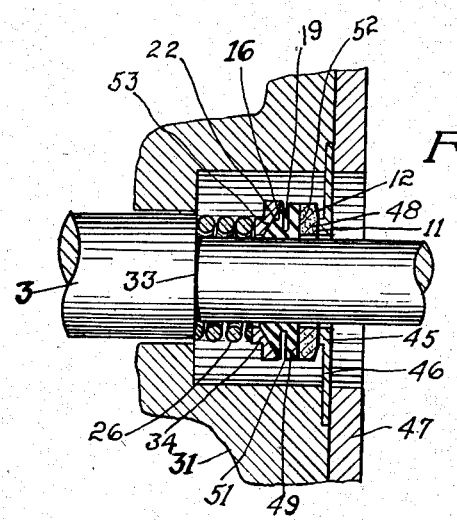
Figure 5:
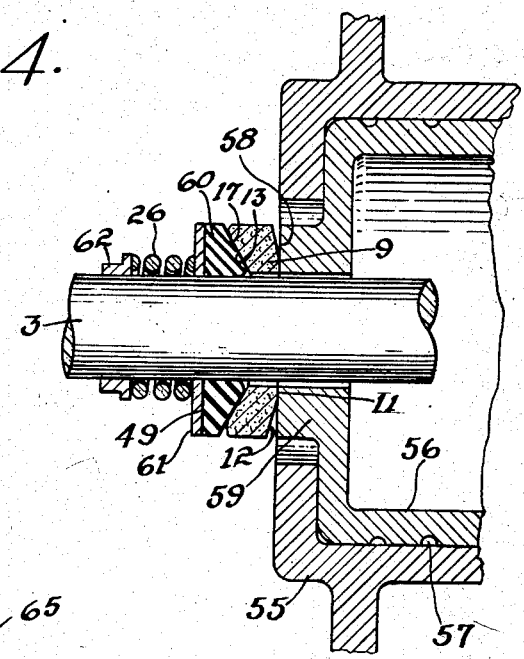
Figure 6:
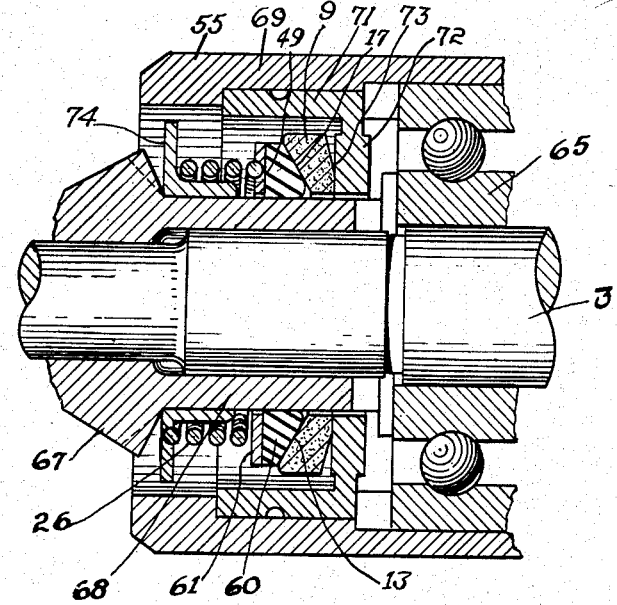

For a more detailed description of the invention, reference is had to the following description and accompanying drawings, wherein I have shown preferred embodiments of my invention by way of example, and wherein:

Figure 1 shows a cross sectional view on a diameter of a preferred embodiment of my invention, Figure 2 is a cross sectional view on a diameter of a preferred form of sealing ring, Figure 2a is a cross sectional view showing an assembly of certain parts in Figure 1, Figure 3 is a cross sectional view of a modification employing a rotating abutment, Figure 4 is a cross sectional view of a further modification, Figure 5 is a cross sectional view of another modification, and Figure 6 is a cross sectional view of still another modification.

Referring to Figure 1, there is shown a preferred embodiment of the invention applied to a centrifugal pump shaft, by way of example. The pump housing 1 has an impeller 2 rotatably mounted therein on shaft 3, which is rotatably journalled in known manner (not shown). The housing 1 has a sealing compartment 5 which may be integral with the pump housing and provides a wall 6 preferably normal to the axis of shaft 3, said wall having an aperture 7 through which the shaft extends. An area 8 surrounding the aperture is smoothly machined to provide a seat, and an annulus 9 of a solid unctuous material is rotatably maintained in contact therewith by means to be presently described.

The annulus 9 preferably is composed of graphite particles held together by a suitable binder, the composition being known in the art. It is preferably shaped to provide on one face a surface area 11 normal to its axis extending for about one third of its outer radius, the remainder 12 of the surface being disposed at an angle to the normal to provide a deviation from the normal of about five to ten thousandths of an inch at the outer diameter, depending on the diameter of the annulus. The opposite face 13 of the annulus is frusto-conical form and is sloped at an angle of about 25° to 35° to the normal. The internal diameter of the annulus will depend on the diameter of the shaft to be sealed and is sufficiently larger to provide a clearance 14 therewith.

The annulus 9 is backed by a member or sleeve 15 of solid elastic or resilient material, such as rubber, "Ameripol," "Neoprene", or the like. "Neoprene" is the trade name of a material I believe to be polymerized chlorobutadiene, and "Ameripol" is the trade name of a material I believe to be a copolymer of acrylonitrile and butadiene. The member 15 is in the form of a sleeve, preferably substantially triangular in cross section, the faces 16 and 17 thereof forming an angle to the normal preferably less acute than the angle of face 13. The bore surface 18 of the sleeve 15 forms a close fit to the shaft 3 and the sleeve has a circumferential kerf or groove 19 extending to a depth of about two thirds the outer radius of the member.

A backing ring 21 has a sloping face 22 which preferably is radially corrugated and is sloped at about the same angle as face 13, and the rear face 23 has a central boss 24 surrounding the aperture 25 which serves as a guide for a helical spring 26. One end of spring 26 abuts the face 23 of washer 21 while the opposite end of the spring abuts the impeller 2 which has a reduced portion 27 to serve as a guide therefor.

In operation the pump shaft 3 will be rotated at a relatively high speed, as is usual in the operation of centrifugal pumps, and a suction or zone of low pressure will be created adjacent the rotor shaft which requires a seal to prevent leakage of air from the exterior. Also, when the pump is stationary it is necessary that the seal prevent leakage of fluid to the exterior of the pump. The spring 26 urges washer 21 axially of the shaft against member 15, which latter member has a close fit on the shaft, and member 15 in turn is urged by the bias of spring 26 against sealing annulus 9 which in turn is urged against the finished face 8 of the wall 6. Thus, spring 26, washer 21, sleeve 15, and annulus 9 rotate in unison with shaft 3.

The unctuous character of member 9 provides a lubricated area of intimate sealing contact between rotating face 11 of member 9 and the smooth wall area 8. As the sealing member 9 is softer than the metal face 8, the face 11 will wear sufficiently to impregnate any pores in face 8 with graphite particles, thus reducing the friction between these surfaces and reducing wear to a minimum after the initial breaking in of the seal occurs. The area 11 is sufficiently narrow so as to enable the seal to be broken in relatively rapidly but is wide enough to provide a sufficient contact area to insure a seal from the beginning. As the face 11 becomes worn, which action is very slow after the initial breaking in period, more of face 12 is brought into the plane area 11 so that the area of contact increases, thus reducing the unit pressure and further reduces the wear of the sealing member 9. Because of the angular relation of face 12, the gradually increasing area of contact is broken in sufficiently rapidly to prevent excessive wear. The member 9 preferably has a porosity of not more than about 8% and a Shore schlerometer hardness of about 40 to 80.

The faces 16 and 17 of sleeve 15 preferably are not parallel with faces 13 and 22 of sealing member 9 and washer 21 respectively. the outer periphery of kerf 19 becomes compressed in initial assembly, as shown in Figure 2a, and the compression of kerf 19 tends to cause a bulge in the face 18 of the sleeve, as shown on an exaggerated scale at 30 (Figure 2a) and thus causes sleeve 15 to grip the shaft 3. The tendency of kerf 19 to assume its normal shape exerts a bias on sealing member 9 which is effective to urge member 9 against its co-operating sealing face 8, even though sleeve 15 may grip the shaft tightly enough to prevent the transmission of sufficient force from spring 26 through the sleeve for this purpose. This gripping of the shaft also assists in preventing unseating of member 9 by movement to the left. However, as the walls of the kerf relax, the grip of the sleeve 15 on the shaft relaxes and the spring is again able to exert its bias on the member 9. The exposed depth of kerf 19 and the sloping face 12 of member 9 also assist in reducing the axial thrust of pressure of the fluid in chamber 5 by reducing the resultant effective area exposed to such pressure. The clearance 14 between the periphery of member 9 and shaft 3 is sealed by the sleeve 15, it being observed that there is no relative movement between sleeve 15 and member 9, and leakage to the exterior past the outer periphery of member 9 is prevented by the sealing contact with face 8. I have found that a durometer hardness of about 55 to 60 for sleeve 15 gives satisfactory results under most conditions.

In the modification shown in Figure 3, wherein like parts are correspondingly numbered, the shaft 3 passes through a chamber 5 in housing 31 having its exterior opening closed by a perforate cover 32 bolted or otherwise suitably secured thereto and through which the shaft passes. A shoulder 33 on the shaft provides an abutment for spring 26, and the rear flat face 34 of washer 35 (which washer corresponds to washer 21) provides an abutment for the other end of the spring. Washer 35 has a forward sloping face 22. An abutment member or washer 37 has a rear face 38 slightly out of parallel with the face 17 of sleeve 15, and its forward face comprises a section 39 normal to the shaft axis and a sloping portion 40 which departs from the normal by a few thousandths of an inch at its outer periphery. The face 39 engages the flat face 41 of an unctuous ring 42 of graphite or similar material as previously described, the ring 42 being cemented to a gasket 43 which is in turn cemented to the cover 32 in sealing relationship. In this modification, the unctuous sealing member 42 is stationary and the co-operating metallic surface or seat member 37, sleeve 15, washer 34 and spring 26 rotate with the shaft 3, leakage between the inner periphery of member 37 and shaft 3 being prevented by sleeve 15, while leakage past the outer periphery of member 37 is prevented by the sealing engagement with ring 42. Thus, it will be seen that in this modification the unctuous ring and sealing surface are transposed.

In the modification shown in Figure 4, the seat member 45 comprises the thickened rib of a plate or diaphragm 46 clamped to the housing 31 by a plate 47 which may be bolted or otherwise suitably secured to the housing 31. The unctuous sealing member 48 has a normal portion 11 and a sloping portion 12 on one face, the portion 11 being in engagement with the seat member 45, and the opposite face 49 of member 48 is flat. The resilient sleeve 51 has a flat face 52 engaging the flat face 49 of the sealing member, the opposite sloping end 16 thereof being engaged by the face 22 of washer 34. The compression of the kerf 19 caused by flexing of only one lip thereof acts in a manner similar to the description in connection with sleeve 15. In this modification seat member 45 is stationary and the other parts of the seal rotate with the shaft 3.

In the modification shown in Figure 5, the stationary housing 55 receives a sleeve 56 with a tight sealing fit, grooves 57 being provided therein which receive oil or any other sealing material to assist in preventing leakage therethrough. The sleeve preferably is composed of cast iron which preferably contains a small percentage of copper, nickel or chromium to render it less porous. The sleeve 56 provides a clearance with the rotating shaft 3 and the outer face 58 of hub 59 thereof is smooth to provide a seat.

The smoothing of face 58 preferably is accomplished by a flat carbide steel or other suitable cutting tool on a high speed turning machine with a feed set at about .001 inch. This results in a face having a flatness of about .0002 inch to .0008 and substantially free from any waves, such as would be produced by grinding or lapping the face. Also, there is no danger of any particles of grit becoming embedded in the face and causing rapid wear.

A sleeve 60 of rubber or similar resilient material has a tapered face 17 engaging the tapered face 13 of sealing member 9 and the flat face 49 is engaged by a backing plate 61. One end of spring 26 preferably is brazed to plate 61, and the other end of the spring engages an abutment collar 62 secured to shaft 3 by a pressed fit or in any other suitable manner. In this modification the kerf 19 is omitted and the non-parallel relation of faces 13 and 17 causes sleeve 60 to grip the shaft and resist movement toward the left, tending to open the seal.

In the modification shown in Figure 6, the shaft 3 is journalled in a suitable ball bearing assembly 65 suitably secured in the casing 55, and at its inner end carries a bevel gear 67 having a hub 68 extending over a portion of the shaft. The bevel gear may rotate in a bath of oil, the seal serving to prevent escape of oil to the exterior or toward the right, as illustrated. The casing is bored at 69 to receive a sleeve 71 in fluid tight relation thereto, the end wall 72 of which provides a seating surface 73 for sealig member 9. An oil thrower 74 in the form of a flanged sleeve is secured on the hub 68 and serves as one abutment for spring 26, the spring being preferably soldered or brazed thereto. The other end of spring 26 abuts washer 61 and is soldered or brazed thereto, this washer preferably being radially serrated on the face abutting sleeve 60. The ring 74, spring 26, plate 61, sleeve 60 and sealing ring 9 thus rotate substantially as one unit, and ring 9 bears against the fixed abutment face 73.

Various modification of the invention may be made without departing from the spirit or scope thereof.

What I claim as my invention and desire to secure by Letters Patent is:

1. In a seal the combination of a member having an opening therethrough, a second member disposed in said opening, said members being relatively rotatable, means providing an annular sealing surface carried by one of said members and disposed substantially normal to the axis of said opening, a ring having a complementary sealing surface arranged to engage and seal on the first sealing surface, a rubber sleeve having a member engaging surface and having one end face adjacent said ring, a second ring adjacent the other end face of the sleeve, a frusto-conical face on the side of one of said rings adjacent the sleeve, the end engaging faces of the sleeve when free being non-parallel relative to the adjacent faces on the rings to provide for deformation of the sleeve, and means to urge the sleeve and rings into engagement to seal the end faces of the sleeve with the rings and deform the body of the sleeve to grip through the member engaging surface and seal on one of said relatively rotatable members preventing relative rotary motion between the sleeve and said member and to exert pressure on the sealing surfaces, the frusto-conical face of the ring forming an acute angle relative to the gripped member to initially contact that portion of the sleeve end face remote of the member engaging surface.

2. In a seal the combination of a member having an opening therethrough, a second member disposed in said opening, said members being relatively rotatable, means providing an annular sealing surface carried by one of said members and disposed substantially normal to the axis of said opening, a ring having a complementary sealing surface arranged to engage and seal on the first sealing surface, a rubber sleeve adjacent said ring and having end faces and a radially disposed circumferential groove extending a substantial distance into the body of the sleeve which when free forms outwardly projecting flanges, a second ring on the other side of the sleeve, a frusto-conical face on one of said rings adjacent the sleeve, and means to urge the sleeve and rings into engagement with the frusto conical surface deforming the adjacent flange without substantial axial contraction of the sleeve and forcing the end faces of the sleeve into mating sealing engagement with the rings and cause the body of the sleeve to grip and seal on one of said relatively rotatable members preventing relative rotary motion between the sleeve and said member and to exert pressure on the sealing surfaces, the frusto-conical face forming an acute angle relative to the gripped member.

3. In a seal the combination of a member having an opening therethrough, a second member disposed in said opening, said members being relatively rotatable, means providing an annular sealing surface carried by one of said members and disposed substantially normal to the axis of said opening, a ring having a complementary sealing surface arranged to engage and seal on the first sealing surface, a frusto-conical face on the opposite side of the sealing ring, a rubber sleeve adjacent said ring and having end faces and a radially disposed circumferential groove extending a substantial distance into the body of the sleeve which when free forms outwardly projecting flanges, a follower ring on the other side of the sleeve having a frusto-conical face opposed to the like face on the sealing ring, and means to urge the sleeve and the rings into engagement with the frusto conical surfaces deforming the adjacent flanges without substantial axial contraction of the sleeve and forcing the end faces of the sleeve into mating sealing engagement with the opposed frusto-conical faces and cause the body of the sleeve to grip and seal on one of said relatively rotatable members preventing relative rotary motion between the sleeve and said member and to exert pressure on the sealing surfaces, the frusto-conical faces forming an acute angle relative to the gripped member.

4. The structure of claim 1 characterized in that said means providing the annular sealing surface is a ring separate from and mounted in nonrotatable sealed relation with said first relatively rotatable member.

5. The structure of claim 1 characterized in that the angle of the sleeve face is greater than the angle of the adjacent frusto-conical face of the ring.

6. The structure of claim 1 characterized in that the angle of the sleeve face is greater than the angle of the adjacent frusto-conical face of the ring and the face on the other end of the sleeve diverges from the face on the ring adjacent thereto.

WALTER GILBERT, Sr.